United States Patent
Zelesky et al.

(10) Patent No.: US 9,260,972 B2
(45) Date of Patent: Feb. 16, 2016

(54) TIP LEAKAGE FLOW DIRECTIONALITY CONTROL

(75) Inventors: Mark F. Zelesky, Bolton, CT (US); Andrew S. Aggarwala, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 845 days.

(21) Appl. No.: 13/540,752

(22) Filed: Jul. 3, 2012

(65) Prior Publication Data

US 2014/0010650 A1 Jan. 9, 2014

(51) Int. Cl.
- *F01D 5/20* (2006.01)
- *F01D 5/18* (2006.01)
- *F01D 5/14* (2006.01)

(52) U.S. Cl.
CPC ........ *F01D 5/18* (2013.01); *F01D 5/146* (2013.01); *F01D 5/20* (2013.01); *F05D 2240/307* (2013.01); *Y02T 50/673* (2013.01); *Y02T 50/676* (2013.01)

(58) Field of Classification Search
CPC ............. F01D 5/146; F01D 5/18; F01D 5/20; F01D 11/08; F05D 2240/307; F05D 2260/202
USPC ...... 415/173.1; 416/90 R, 92, 95, 96 R, 97 R, 416/228, 235, 236 R
See application file for complete search history.

(56) References Cited

U.S. PATENT DOCUMENTS

| | | | |
|---|---|---|---|
| 5,503,527 A * | 4/1996 | Lee et al. | 416/91 |
| 5,997,251 A * | 12/1999 | Lee | 416/97 R |
| 6,059,530 A * | 5/2000 | Lee | 416/97 R |
| 6,132,169 A | 10/2000 | Manning et al. | |
| 6,974,308 B2 | 12/2005 | Halfmann et al. | |
| 7,150,601 B2 | 12/2006 | Pietraszkiewicz et al. | |
| 7,320,575 B2 | 1/2008 | Wadia et al. | |
| 7,513,743 B2 | 4/2009 | Liang | |
| 7,625,178 B2 | 12/2009 | Morris et al. | |
| 7,713,026 B1 | 5/2010 | Liang | |
| 7,837,440 B2 | 11/2010 | Bunker et al. | |
| 7,934,906 B2 | 5/2011 | Gu et al. | |
| 8,043,058 B1 | 10/2011 | Liang | |
| 8,092,179 B2 | 1/2012 | Paauwe et al. | |
| 8,113,779 B1 | 2/2012 | Liang | |
| 8,133,032 B2 | 3/2012 | Tibbott et al. | |
| 8,313,287 B2 | 11/2012 | Little | |
| 8,435,004 B1 | 5/2013 | Liang | |

* cited by examiner

Primary Examiner — Dwayne J White
Assistant Examiner — Alexander White
(74) Attorney, Agent, or Firm — Kinney & Lange, P.A.

(57) ABSTRACT

A turbine airfoil comprises a suction sidewall, a pressure sidewall, a tip wall, and a tip leakage control channel. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control channel has an inlet and an outlet recessed into an outer surface of the tip wall. An inlet of the channel begins proximate a junction of the airfoil pressure sidewall and the tip wall. An outlet of the channel terminates at a recessed portion of the junction of the tip wall and the suction sidewall.

23 Claims, 8 Drawing Sheets

TIP LEAKAGE FLOW DIRECTIONALITY CONTROL

BACKGROUND

The described subject matter relates generally to turbine engines and more specifically to cooling turbine blades.

Turbine engines provide efficient, reliable power for a wide range of applications in aviation, transportation and industrial power generation. Individual compressor and turbine section(s) may be subdivided into a number of stages, formed of alternating rows of rotor blade and stator vane airfoils. Due to various operational constraints, rotor blades and stator vanes are prone to leakage of compressed gases over their tips from a higher pressure surface to a lower pressure surface. Several attempts have been made to reduce these flows, but they cannot be completely eliminated due to clearance requirements over the airfoil tips which account for variations in both thermal and centrifugal growth of adjacent components.

SUMMARY

A turbine airfoil comprises a suction sidewall, a pressure sidewall, a tip wall, and a tip leakage control channel. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control channel has an inlet and an outlet recessed into an outer surface of the tip wall. An inlet of the channel begins proximate a junction of the airfoil pressure sidewall and the tip wall. An outlet of the channel terminates at a recessed portion of the junction of the tip wall and the suction sidewall.

A turbine airfoil comprises a suction sidewall, a pressure sidewall, a tip wall, and a tip leakage control vane. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control vane projects radially outward in a spanwise direction from a tip floor of the tip wall. A leading portion of the tip leakage control vane begins proximate a junction of the airfoil pressure sidewall and the tip wall. A trailing portion of the tip leakage control vane terminates proximate a junction of the airfoil suction sidewall and the tip wall.

A method for reducing airfoil tip leakage losses comprises capturing a portion of working fluid leakage flow in a leakage control channel formed into a radially outer surface of an airfoil tip wall. The captured portion of the leakage flow is redirected toward an airfoil trailing edge through a curved portion of the tip leakage control channel. The redirected portion of the leakage flow is ejected out of the tip leakage control channel into a suction side gas stream below a junction of an airfoil suction sidewall and the radially outer surface of the tip wall.

DETAILED DESCRIPTION

Figure 1:
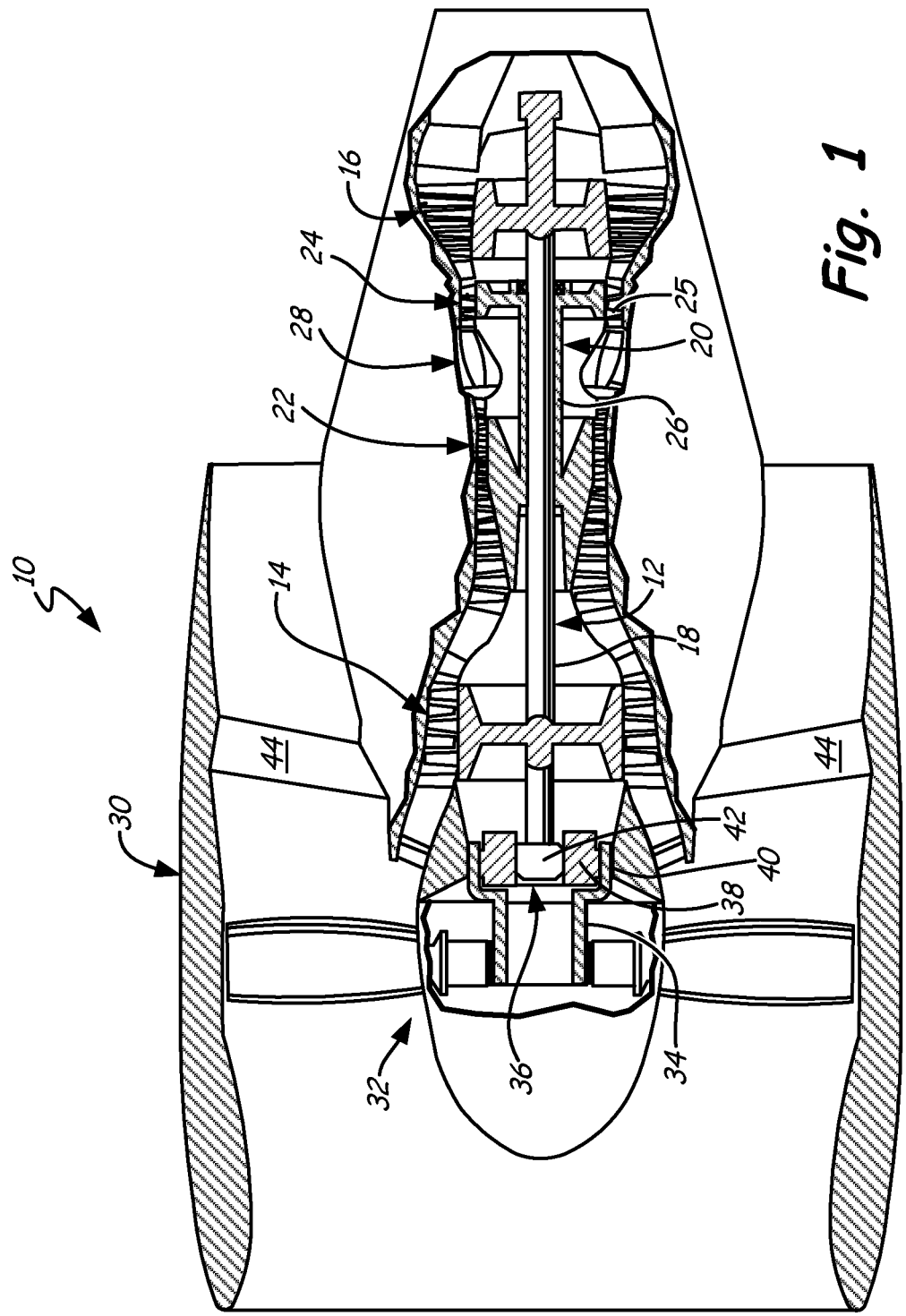
FIG. 1 schematically depicts a cross-section of a turbofan gas turbine engine.

FIG. 1 is a cross-sectional view of gas turbine engine 10, including low spool 12, low pressure compressor (LPC) 14, low pressure turbine (LPT) 16, low pressure shaft 18, high spool 20, high pressure compressor (HPC) 22, high pressure turbine (HPT) 24, rotor blades 25, high pressure shaft 26, combustor 28, nacelle 30, propulsion fan 32, fan shaft 34, fan drive gear system 36, planetary gear 38, ring gear 40, sun gear 42, and fan exit guide vanes 44.

In the example two-spool, high bypass turbofan configuration, low spool 12 includes low pressure compressor (LPC) 14 driven by low pressure turbine (LPT) 16 via low pressure shaft 18. High spool 20 includes high pressure compressor (HPC) 22 driven by high pressure turbine (HPT) 24 via high pressure shaft 26. Low pressure shaft 18 and high pressure shaft 26 are mounted coaxially and rotate at different speeds. The power core also includes combustor 28 arranged in flow series between the compressor and turbine sections. HPT 24 and LPT 16 can each include at least one stage of circumferentially distributed rotor blades 25. More details of an example rotor blade 25 are described below.

Propulsion fan rotor 32 drives air through the bypass duct coaxially oriented between the engine core and nacelle 30. Fan rotor (or other propulsion stage) 32 can be directly or indirectly rotationally coupled to low pressure shaft 18. In advanced designs, fan drive gear system 36 couples fan shaft 34 to low spool 12, with respective planetary, ring, and sun gear mechanisms 38, 40 and 42 providing independent fan speed control for reduced noise and improved operating efficiency. In more conventional turbofan designs, fan drive gear system 36 is omitted and fan 32 is driven directly as part of low spool 12. Fan exit guide vanes (FEGVs) 44 are disposed between nacelle 30 and the engine core to reduce swirl and improve thrust performance through the bypass duct. In more compact engine designs, FEGV's may also be structural, providing combined flow turning and load bearing capabilities.

It will be recognized from the remainder of the description that the invention is by not limited to the example two-spool high bypass turbofan engine shown in FIG. 1. By way of further non-limiting examples, fan rotor 32 may additionally or alternatively include an unducted rotor, with turbine engine 10 thereby operating as a turboprop or unducted turbofan engine. Alternatively, fan rotor 32 may be absent, leaving nacelle 30 covering only the engine core, with turbine engine 10 thereby being configured as a turbojet or turboshaft engine. The described subject matter is also readily adaptable to other gas turbine engine components. While the working fluid is described here with respect to a combustion gas turbine, it will be appreciated that the described subject matter can be adapted to engines using other working fluids like steam.

Figure 2:
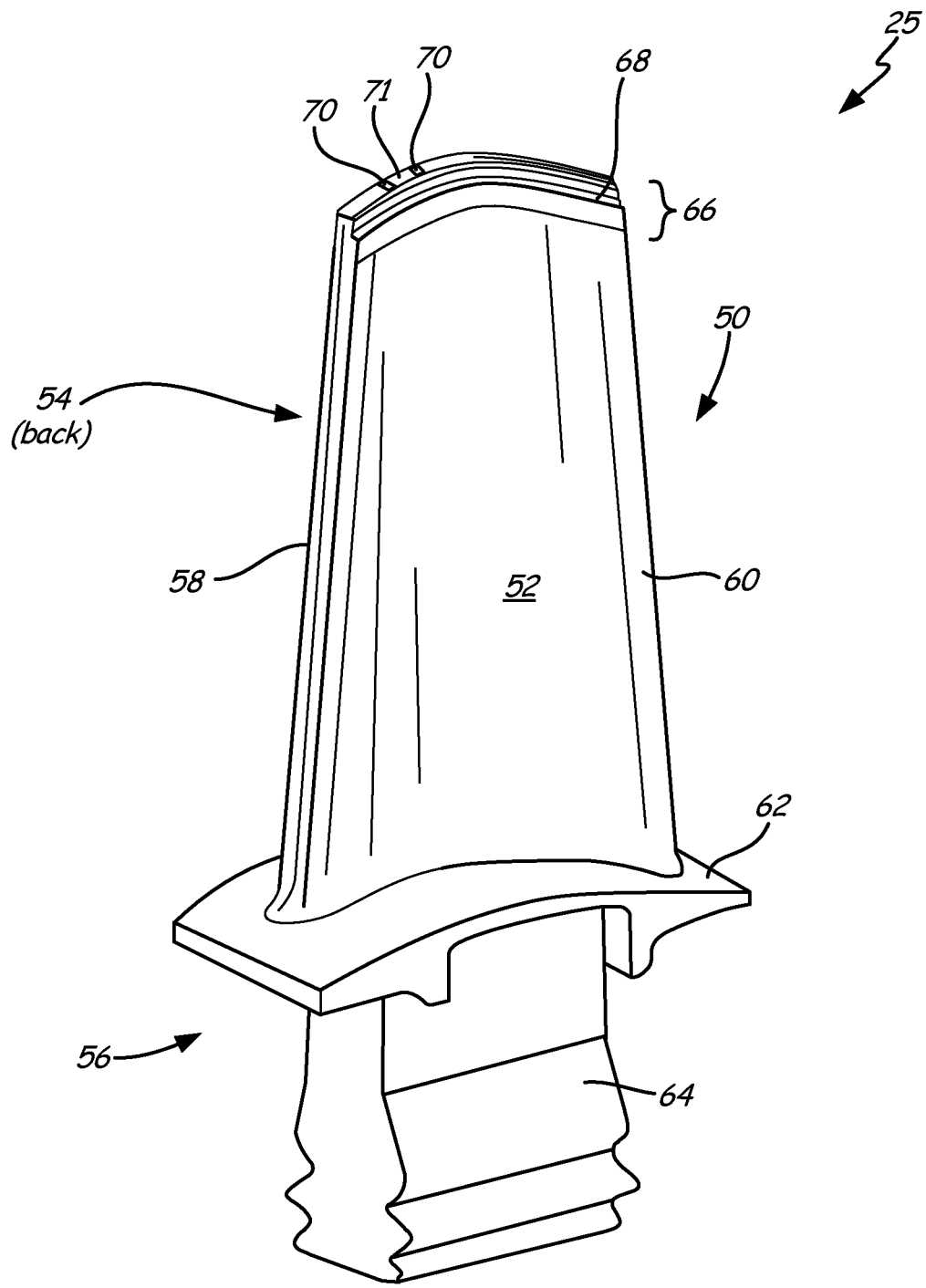
FIG. 2 shows a perspective of an exemplary gas turbine engine rotor blade.

FIG. 2 is a perspective view of turbomachine rotor blade 25, and shows airfoil section 50, pressure sidewall 52, suction sidewall 54, base 56, leading edge 58, trailing edge 60, platform 62, root 64, tip wall 66, tip shelf 68, tip leakage control channels 70, and tip leakage control vane 71.

Rotor blade 25 includes airfoil 50 defined in part by pressure sidewall 52 (front) and suction sidewall 54 (back), each extending spanwise from base 56, and chordwise between leading edge 58 and trailing edge 60. Base 56 can include platform 62 and root 64, which in this example of rotating blade 25, secure airfoil 50 to a rotor disc (not shown). Tip wall 66 extends chordwise from leading edge 58 to trailing edge 60 to join respective outer spanwise ends of pressure sidewall 52 and suction sidewall 54. Airfoil 50 can include one or more tip leakage control elements on or around tip wall 66, such as tip shelf 68, tip leakage control channel(s) 70, and tip leakage control vane(s) 71. While this example is shown as rotor blade 25, airfoil 50 can alternatively define an aerodynamic section of a cantilevered stator vane, with attendant modifications made to the vane base for securing airfoil 50 to an outer circumferential casing.

In operation, pressurized gas flows generally chordwise along both sidewalls 52, 54 from leading edge 58 to trailing edge 60. Airfoil 50 is provided with one or more elements on or around tip wall 66, operating in conjunction with adjacent elements of engine 10 to reduce tip leakage losses. In this general example of blade 50, airfoil 25 includes tip shelf 68 at the junction of pressure sidewall 52 and tip wall 66. It will be recognized that in certain embodiments, tip shelf 68 may be omitted, leaving pressure sidewall 52 continuous up through its junction with tip wall 66. Tip wall 66 can also include at least one tip leakage control channel 70 and/or leakage control vane 71, such as is shown in the example embodiments below. With higher pressure differentials favored along the front-facing pressure sidewall 52, some of the higher pressure gas flowing along suction sidewall 54 tends to leak over tip wall 66. In traditional airfoil designs high pressure gradients from the pressure sidewall to the suction sidewall drives a leakage flow over the tip. This results in lost work extraction as the tangential momentum of the leakage flow is not changed by the airfoil, and higher aerodynamic losses as the leakage flow is reintroduced into the main passage flow. Both of these effects result in reduced efficiency. Tip leakage control channel(s) 70 and tip leakage control vane(s) 71 reduce some of the negative effects of this inevitable leakage flow.

Figure 3A:
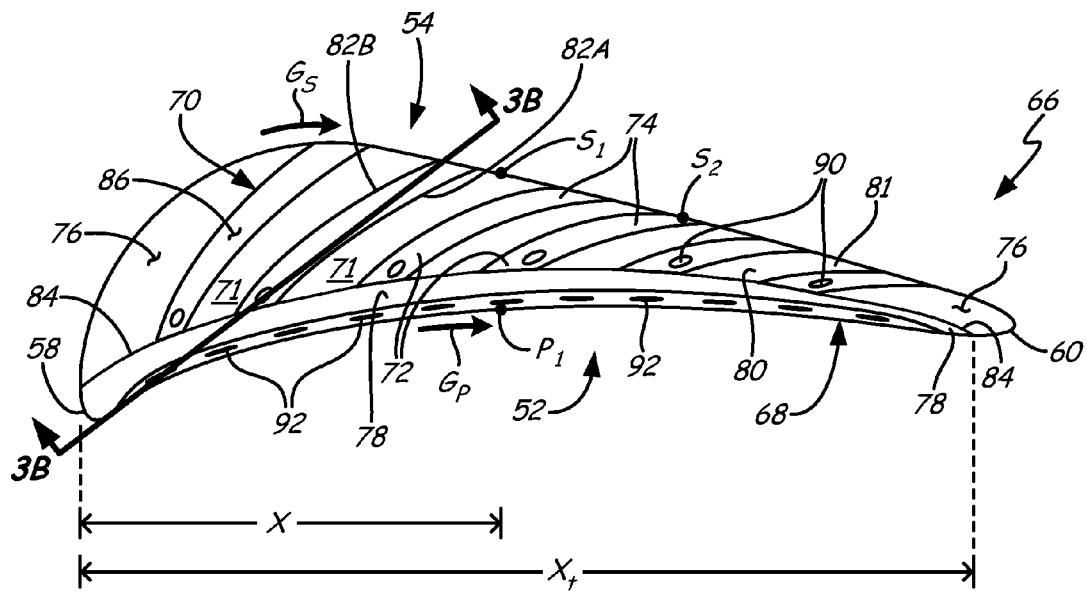
FIG. 3A is a top plan view of the rotor blade shown in FIG. 2.
Figure 3B:
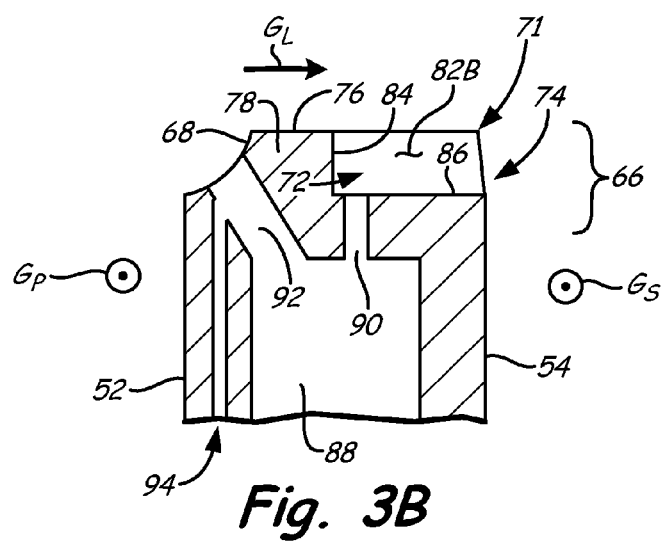
FIG. 3B is a partial cross-section of the rotor blade from FIG. 3A.

FIG. 3A is a top plan view of a first example embodiment of airfoil 50, showing tip wall 66. FIG. 3B is an upstream-facing cross-section taken along line 3B-3B. FIGS. 3A and 3B include pressure sidewall 52, suction sidewall 54, leading edge 58, trailing edge 60, tip wall 66, tip shelf 68, tip leakage control channels 70, tip leakage control vanes 71, control channel inlets 72, control channel outlets 74, tip outer surface 76, tip rib 78, control vane leading portion 80, control vane trailing portion 81, control channel/vane sidewalls 82A, 82B, tip rib suction side 84, control channel floors 86, internal cooling cavity 88, channel cooling apertures 90, tip shelf cooling apertures 92, and airfoil sidewall microcircuit 94.

In this first example embodiment, tip wall 66 includes at least one curved tip leakage control channel 70 and at least one curved tip leakage control vane 71. More than one leakage control channel 70 can be distributed across at least a chordwise portion of tip wall 66 extending between airfoil leading edge 58 and airfoil trailing edge 60. Control channels 70 each include inlet 72 and outlet 74, which may be recessed into or otherwise formed with radially outer surface 76 of tip wall 66. One or more corresponding spanwise tip leakage control vanes 71, can be formed with tip wall outer surface 76 between pairs of adjacent tip leakage control channels 70.

Channel inlets 72 are generally disposed proximate the junction of pressure sidewall 52 and tip wall 66. Inlets 72 can be offset widthwise from a junction in order to minimize effective tip clearance, and to block or trip some of the leakage flow $G_L$ across wall 66. The plurality of channel inlets 72 can be aligned along a chordwise path as shown. In certain embodiments, channel inlets are aligned with tip rib 78, which can extend chordwise along at least a portion of the pressure side of tip wall 66 between airfoil leading edge 58 and airfoil trailing edge 60. Tip rib 78 can be provided as part of outer surface 76 to reduce clearance between radially adjacent engine components such as a casing, an air seal, or a rotor land (if configured as part of a stator vane). Control vanes 71 may have a leading portion 80 defined in part by chordwise-adjacent channel inlets 72, and a trailing portion 81 defined in part by chordwise-adjacent channel outlets 74. In this example, channels 70 are defined by sidewalls 82A, 82B, which can also respectively serve as control vane pressure sidewall 82A and control vane suction sidewall 82B. In certain embodiments, control vane leading portion 80 is contiguous with suction side 84 of tip rib 78 to further reduce leakage flow while directing the remainder into and through control channels 70. Control vane trailing portions 81 may be contiguous with suction sidewall 52 between channel outlets 74 terminating at a recessed portion of the junction of suction sidewall 52 and tip wall 66.

In this example, channel 70 has a box shaped cross-section, where adjacent channel sidewalls 82A, 82B extend substantially perpendicular to flat channel floor 86. In this example, vanes 71 extend spanwise from adjacent control channel floors 86 recessed into tip wall 66 from outer surface 76. In alternative embodiments, such as those shown in FIGS. 6A and 6B, one or more vanes may extend spanwise from a lowered tip floor outer surface extending generally from airfoil leading edge 58 to trailing edge 60. It will be appreciated that one or more channels 70 can additionally or alternatively have different cross-sections, and those cross-sections can vary between inlet 72 and outlet 74. By way of one non-limiting example, one or more channels 70 can have a continuously curved sidewall to form a u-shaped cross-section. By way of other non-limiting examples, one or more channels 70 can have angled floors or sidewalls. In yet other examples, channel floor 86 can be omitted to form an upright v-shaped cross-section. Other irregular cross-sections are also possible for tailoring channels 70 and/or vanes 71 to different tip leakage profiles.

In certain embodiments, airfoil 50 is an internally cooled turbine blade, and includes at least one internal cooling cavity 88. Cooling cavity 88 can be formed during investment casting of airfoil 50 using one or more shaped casting cores. The cores may be made from ceramics, refractory metals, or a combination thereof. An example of a combined ceramic and refractory metal casting core is described in commonly assigned U.S. Pat. No. 6,637,500 by Shah et al., which is herein incorporated by reference in its entirety. Other casting core technology may also be implemented.

One or more leakage control channels 70 can include at least one cooling aperture 90 in fluid communication with internal cavity 88 for cooling control channel 70. While shown as a single round through hole drilled or cast into channel floor 86 proximate channel inlet 72, aperture 90 may be one or more apertures 90, at least some of which can have an alternative form or position tailored to the relative pressure profile over tip wall 66. Aperture 90 may, for example, additionally or alternatively discharge coolant into channel 70 from tip rib suction side 84, and/or channel sidewalls 82A, 82B. Tip shelf 68 can also additionally or alternatively include at least one pressure side cooling aperture 92 to direct coolant along the junction of pressure sidewall 52 and tip wall 66. Apertures 92 thus may be diffusion holes or slots to create an effective wall of coolant along tip shelf 68 for impeding tip leakage. Apertures 92 can be in fluid communication with cooling cavity 88, which may be the same cavity 88 feeding apertures 90, or it may be a separate cooling cavity. In certain embodiments, pressure sidewall 52 and suction sidewall 54 can include one or more microcircuit cooling cavities 94 formed separate from or contiguous with internal cooling cavity 88. Microcircuit(s) 94, which may be formed in pressure sidewall 52 and/or suction sidewall 54 using at least one refractory metal casting core, can optionally be in fluid communication with apertures 92 or can alternatively feed coolant to dedicated apertures.

Figure 3C:
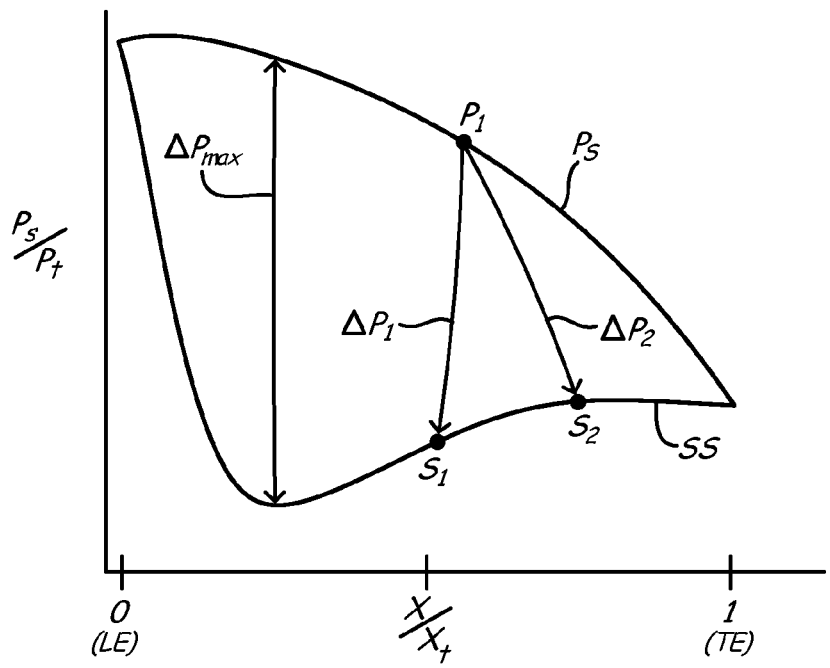
FIG. 3C is a graph showing relative pressures on opposing rotor blade surfaces.

FIG. 3C is a graph of relative pressures around tip wall 66. FIG. 3C graphically shows the pressure relationship across tip wall 66 with vertical plotting of pressure ratio $P_s/P_t$ at relative chordwise positions $x/x_t$. $P_s$ is the localized static pressure and $P_t$ is the localized total pressure. For simplicity, the scale $x/x_t$ is measured linearly along chordwise tip rib suction side 84, which also doubles in this example as an upstream wall of each channel inlet 72. Other relative scales may be used giving slightly different relative pressure readings, but the relative pressure profiles will be substantially consistent across these different scales.

As is expected, pressure side (PS) and suction side (SS) readings of $P_s/P_t$ are equal when $x/x_t$ is at point 0, corresponding to leading edge 58. The pressure differential $\Delta P$ increases then decreases chordwise until being equal again when $x/x_t$ reaches point 1, corresponding to trailing edge 60. The exact pressure relationship along tip wall 66 will depend on operating conditions, sweep of the airfoil, relative curvatures of pressure sidewall 52 and suction sidewall 54, among other factors. It can be seen that in the example turbine airfoil 50, there is a fairly large $\Delta P$ range around the midchord region of the tip. Around midchord, the PS pressure has not yet fallen off, while the SS pressure drops to a minimum before recovering close to trailing edge 60. Here, the maximum pressure differential $\Delta P_{max}$ between pressure side flow $G_P$ and suction side flow $G_S$ occurs just forward of midchord.

As seen in FIG. 3A, tip wall 66 includes tip leakage control channels 70 and control vanes 71 at various relative chordwise positions $x/x_t$. To illustrate operation of one such channel 70 disposed roughly midchord along tip wall 66, FIG. 3C shows approximations of the relative pressure differentials $\Delta P_1$ and $\Delta P_2$, comparing leakage flow paths in a conventional blade tip versus a blade tip having at least one channel 70. With a conventional tip, leakage flow $G_L$ originating around point $P_1$ of pressure sidewall 52 will take the shortest path over the tip wall toward point $S_1$ roughly perpendicular to pressure sidewall 52 at that point. Leakage flow $G_L$ thus collides roughly perpendicular with suction flow $G_S$ around point $S_1$. Since airfoil 50 is in relative rotational motion along with gas flows $G_P$ and $G_S$, and because pressure side gas flow $G_P$ is necessarily slower than $G_S$, leakage flow $G_L$ between points $P_1$ and $S_1$ has virtually zero relative chordwise momentum, and high circumferential momentum, compared to substantial chordwise momentum of suction flow $G_S$.

In contrast, tip leakage control channel 70 captures a localized portion of leakage flow $G_L$ at inlet 72, and redirects it through a curved portion of channel 70 toward airfoil trailing edge 60. The redirected flow is ejected from the channel, entering the suction side gas stream proximate point $S_2$, downstream of the normal point of entry $S_1$. Since channel 70 can be recessed below the outermost surface of tip wall 66, the flow enters the suction side gas stream below the junction of surface 76 and suction sidewall 54. In this example, $P_s/P_t$ is actually greater at point $S_2$ than at point $S_1$, reducing the magnitude of leakage based on a smaller pressure differential $\Delta P_2$. By redirecting the entry point of leakage flow $G_L$ downstream toward point $S_2$, channel 70 (and control vane 71) also imparts/converts a portion of the momentum into an increased chordwise component, which necessarily reduces the conflicting widthwise momentum component of the leakage flow perpendicular to suction side flow $G_S$. This has two positive effects on the gas flows.

Redirecting leakage momentum downstream from point $S_1$ allows leakage flow $G_L$ to more quickly integrate into $G_S$, closer to suction sidewall 54. Decreasing widthwise momentum and/or increasing the tangential momentum of leakage flow $G_L$ entering suction side flow $G_S$ reduces conflict and turbulence at the entry point(s) by permitting less penetration of leakage flow $G_L$ to into the main flow path of suction gas flow $G_S$. With a larger chordwise (tangential) momentum component aligned with flow $G_S$, there also ends up being less boundary flow disturbance of suction gas flow $G_S$, reducing flow separation around tip wall 66. All of these increase efficiency by reducing the size and strength of resulting tip leakage vortices as shown in FIGS. 4A and 4B.

Figure 4A:
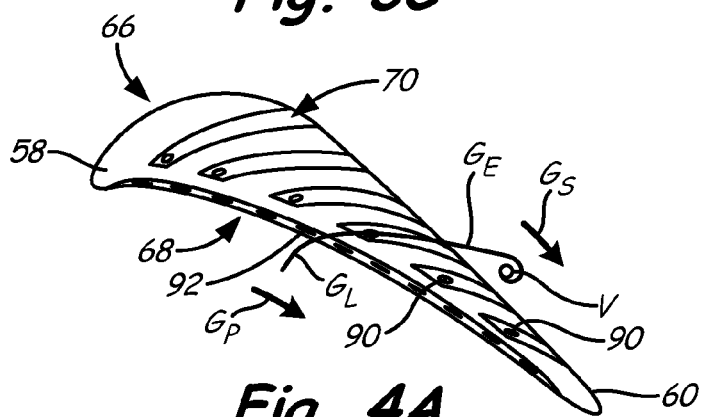
FIG. 4A depicts a vortex caused by leakage over the tip of the rotor blade.
Figure 4B:
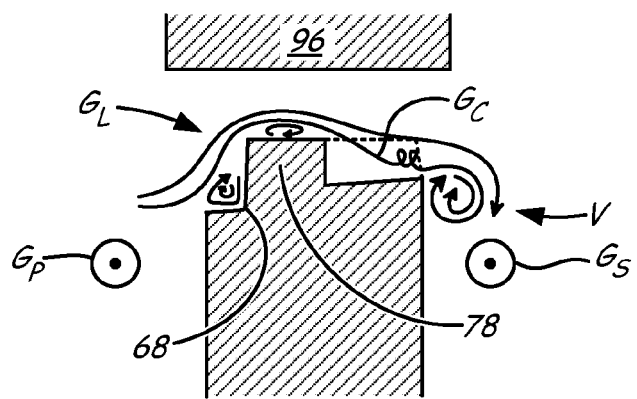
FIG. 4B shows a second view of the vortex caused by leakage between the tip and an adjacent seal surface.

FIG. 4A shows tip leakage vortices exiting channel 70 and being integrated into suction gas flow $G_S$, and includes pressure sidewall 52, suction sidewall 54, airfoil leading edge 58, airfoil trailing edge 60, tip wall 66, tip shelf 68, and tip leakage control channels 70, and control channel cooling apertures 90. FIG. 4B is a cross-section of tip wall 66 taken through channel 70 with air seal 96 radially adjacent tip wall 64 to minimize clearance at tip wall 66. Optional internal details of the blade and air seal 96, such as cavities and cooling apertures have been omitted for clarity and to better illustrate the effects of leakage control cavity 70.

Air seal 96 cooperates with tip wall 66 to minimize clearance, and overall tip leakage therebetween. Air seal 96 can be any conventional or inventive blade outer air seal (BOAS) compatible with an unshrouded rotor blade. Air seal 96 may optionally include a sacrificial layer to reduce rubbing damage to tip rib 78, or more generally to tip wall 66, during maximum centrifugal and thermal expansion of airfoil 50 relative to the surrounding casing (not shown) onto which air seal 96 is mounted.

As explained above with respect to FIG. 3C, large pressure differentials across tip wall 66 result in leakage flow $G_L$ passing over tip shelf 68 and tip rib 78 with substantial initial widthwise momentum. Channels 70 and vanes 71 help capture a portion of that flow, and redirect it downstream as it passes over tip wall 66, providing channel flow $G_C$ with increased chordwise momentum compared to other leakage flow $G_L$. The portion of leakage flow $G_L$ flowing through channel 70 joins with suction gas flow $G_S$ at a higher pressure downstream location. Entry flow $G_E$ results in vortex V when joining suction gas flow $G_S$. However, position of vortex V is smaller and closer to suction sidewall 54 than it would be absent leakage control channels 70 and vanes 71. The magnitude of vortex V can also be reduced due to addition of chordwise momentum to entry flow $G_E$ from channels 70 and vanes 71.

Figure 5A:
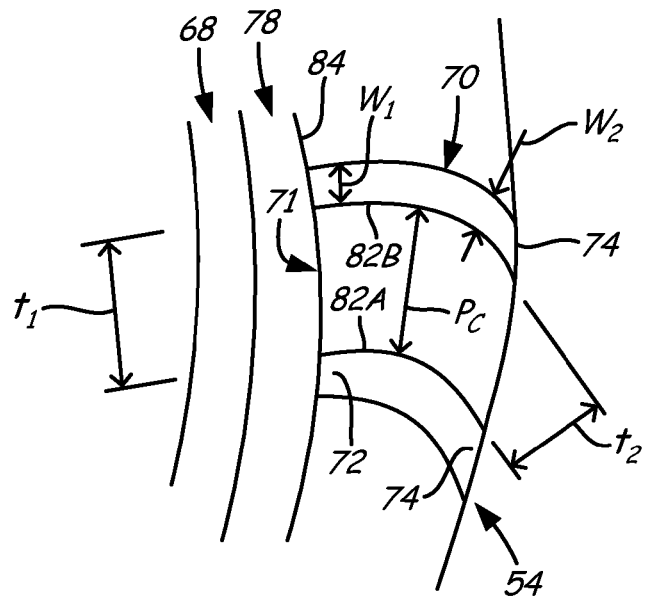
FIG. 5A is a magnified view of tip leakage control channels and vanes.

FIG. 5A shows two adjacent tip leakage control channels 70 bounding an intermediate tip leakage control vane 71, and also includes pressure sidewall 52, suction sidewall 54, tip wall 66, tip shelf 68, tip leakage control channels 70, tip leakage control vanes 71, control channel inlets 72, control channel outlets 74, tip outer surface 76, tip rib 78, vane leading portion 80, vane trailing portion 81, control channel/vane sidewalls 82A, 82B, tip rib suction side 84, and control channel floors 86. Channel cooling apertures 90 and tip shelf cooling apertures 92 have been omitted for clarity.

As seen here, channel inlets 72 have first chordwise width $W_1$ proximate channel inlet 72, and outlets have second chordwise width $W_2$ proximate channel outlet 74. In certain embodiments, second chordwise width $W_2$ proximate outlet 74 is equal to or less than first chordwise width $W_1$. In alternative embodiments, second width $W_2$ is greater than first width $W_1$. Similarly control vane 71 includes leading chordwise thickness $t_1$ proximate tip rib 78, and trailing chordwise thickness $t_2$ proximate suction sidewall 54. In certain embodiments, trailing chordwise thickness $t_2$ is equal to or less than leading chordwise width $t_1$. In alternative embodiments, thickness $t_1$ is greater than thickness $t_2$. Adjacent channels 70 can be separated by pitch $P_c$, which is an average distance between the sidewalls 82A, 82B of adjacent channels 70. $P_c$ is shown as average separation because the inlet and outlet widths $W_1$, $W_2$ of individual channels 70 may vary in the same channel 70 as well as between adjacent channels. In certain embodiments $P_c$ is constant across at least a chordwise portion of tip wall 66. Pitch $P_c$ may vary elsewhere along tip wall 66 based on relative curvatures of channels 70 and vanes 71, described below in FIG. 5B.

Figure 5B:
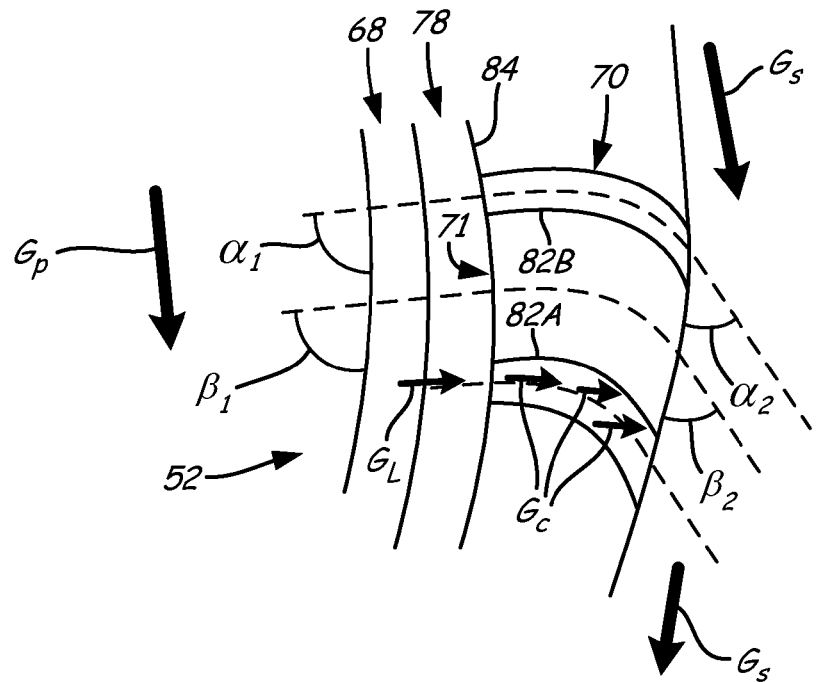
FIG. 5B shows angles of tip leakage control channels and vanes from FIG. 5A.

FIG. 5B shows the relative angles of channels 70 and vanes 71 shown in FIG. 5A. Channel inlet 72 forms channel entrance interior angle $\alpha_1$ relative to pressure sidewall 52. Channel outlet 74 forms channel exit interior angle $\alpha_2$ relative to suction sidewall 54. In certain embodiments, angle $\alpha_2$ is less than or equal to $\alpha_1$. The effective curvature radius of channel 70 is thus the same or greater than the local curvature radius of tip wall 66.

In certain of those embodiments, channel entrance angle $\alpha_1$ is between about 80° and about 95°. Channel entrance angle $\alpha_1$ may be greater than 90° when leakage flow $G_L$ cascading over the upper region of pressure sidewall 52 is expected to have a substantial chordwise flow component relative to the motion of airfoil 50 at the leakage point. When leakage flow $G_L$ is expected to have substantially zero chordwise momentum around the leakage point, channel entrance angle $\alpha_1$ may be less than or equal to about 90°. This may occur, for example, as a result of tip shelf 68 (and shelf cooling apertures 92) reducing net leakage flow $G_L$.

Flow out of channel cooling apertures 90 (not shown in FIG. 5B) may also impart a counteracting momentum component to channel flow $G_C$ once leakage flow $G_L$ has entered inlet 72. In certain embodiments, channel exit angle $\alpha_2$ can be less than about 90° which can impart additional chordwise momentum to channel flow $G_C$ exiting outlet 74. Similarly, control vane leading portion 80 forms leading interior angle $\beta_1$ relative to pressure sidewall 52, and control vane trailing portion 81 forms trailing interior angle $\beta_2$ relative to suction sidewall 54. Angles $\beta_1$ and $\beta_2$ are measured around the respective chordwise midpoint of vane leading and trailing portions 80, 81. In certain embodiments, angle $\beta_2$ is less than or equal to $\beta_1$.

FIG. 5B also illustrates another effect of tip leakage control channels 70 and vanes 71. Since tip leakage flow typically enters channel 70 approximate perpendicular to the local junction with pressure sidewall 52, channel gas flow will tangentially strike sidewall 82A before being redirected. This can cause initial flow turbulence directly above channel inlet 72, which introduces tip vortices into the clearance gap between tip wall 66 and air seal 96 (shown in FIG. 4B), blocking a portion of additional leakage flow $G_L$ over tip wall 66. These clearance vortices can be further enhanced by coolant flow directed outward from channel cooling apertures 92. In addition, tangential contact of channel flow $G_C$ with channel/vane sidewall 82A imparts a measure of thrust onto vane 71, allowing some work to be recovered from leakage flow.

Figure 5C:
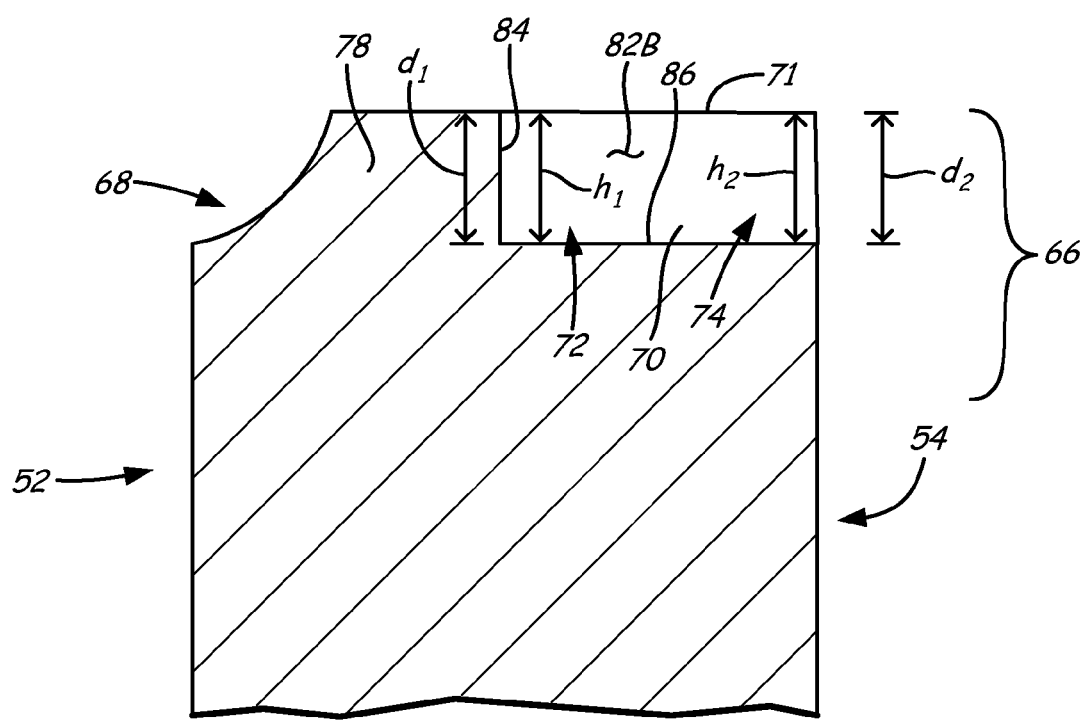
FIG. 5C shows relative radial dimensions of a tip leakage control channel and vane from FIG. 5A.

FIG. 5C is a side view of airfoil 50 with pressure sidewall 52, suction sidewall 54, tip wall 66, tip shelf 68, tip leakage control channel 70, tip leakage control vane 71, leakage control channel inlet 72, leakage control channel outlet 74, tip rib 78, leakage control vane leading portion 80, leakage control vane trailing portion 81, leakage control vane sidewall 82B, tip rib suction side wall 84, and leakage control channel floor 86.

FIG. 5C shows the radial dimensions of leakage control channel and vane 70, 71. As in FIG. 4B, internal details of the blade such as cavities and cooling apertures have been omitted to show the remaining reference dimensions of leakage control channel 70 and vane 71. It can be seen here that leakage control channel 70 can have first depth $d_1$ measured for example proximate inlet 72 and second depth $d_2$ proximate outlet 74. The depths are generally the respective distances that channel floor 86 is recessed relative to an upper portion of tip wall 66. This upper portion may be the top of tip rib 78 and/or control vane 71, but in certain embodiments, first and second depths $d_1$, $d_2$ may be measured from different upper surface.

Similarly, a first height $h_1$ of leakage control vane 71 is measured around its leading portion 80, and a second height $h_2$ is measured around the trailing portion 81. These heights $h_1$ and $h_2$ are typically determined relative to channel floor 86. In certain embodiments, however, heights $h_1$ and $h_2$ can be determined relative to tip floor 76.

Depending on pressure differentials along a particular airfoil 50 (e.g., as shown in FIG. 3C), dimensions, separation, and curvature of channels 70 and vanes 71 may be adapted to optimize redirection of leakage flow while still maintaining adequate tip cooling and material strength. Dimensions of channels 70 and vanes 71 will also affect the practical dimensions and angles that can be achieved. These relative dimensions and pitches can be adapted optimize performance based on expected or modeled pressure differentials at different locations around tip wall 66. Relative curvatures can be defined first with dimensions resulting therefrom, or relative dimensions may be defined with resulting curvatures. The overall configuration of tip wall 66 can also be determined iteratively based on one or more constraints of the various widths, thicknesses, pitches, and angles.

For example, in locations where leakage is most likely, such as proximate midchord where pressure side pressures are highest, channels 70 may have a wider inlet $W_1$. They can also be provided with a narrower outlet width $W_2$ relative to $W_1$, which can increase the pressure and exit velocity of leakage flow $G_L$ entering the suction gas stream $G_S$. In other embodiments, at locations with lower relative suction side pressures, $W_2$ may be the same as or even greater than $W_1$ in order to more closely match the entry pressure and velocity. Further, the relative and absolute pressures, along with available tip wall surface area, will also determine the pitch $P_c$ of channels 70. As before, the midchord region of tip wall 66 may have smaller pitch values $P_c$. It will be recognized that widths $W_1$ will generally vary inversely with thickness $t_1$ and vice versa. Similarly, widths $W_2$ generally vary inversely with thickness $t_2$ and vice versa. As also explained below, channel floor 86 may be sloped such that $d_2$ is less than $d_1$.

Figure 6A:
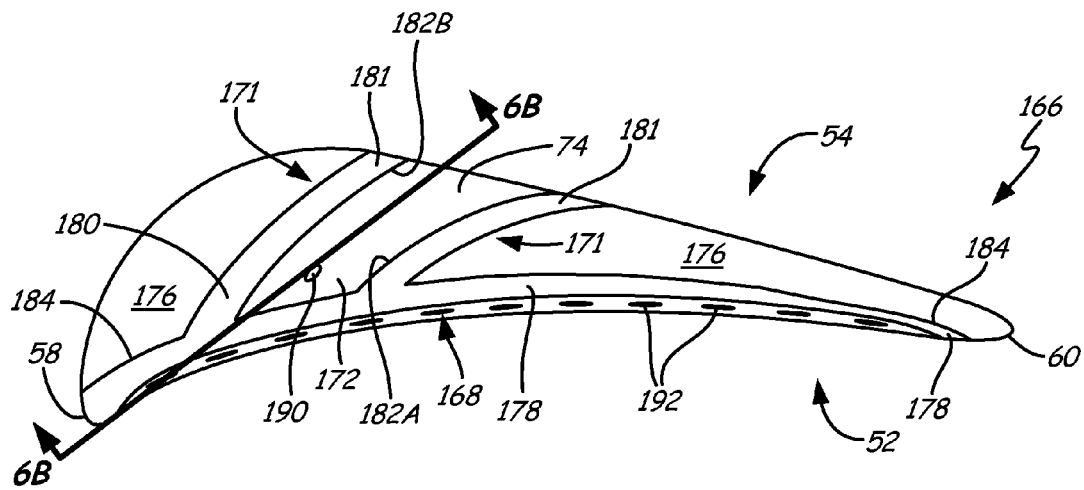
FIG. 6A is a top plan view of a first alternative rotor blade tip wall configuration.
Figure 6B:
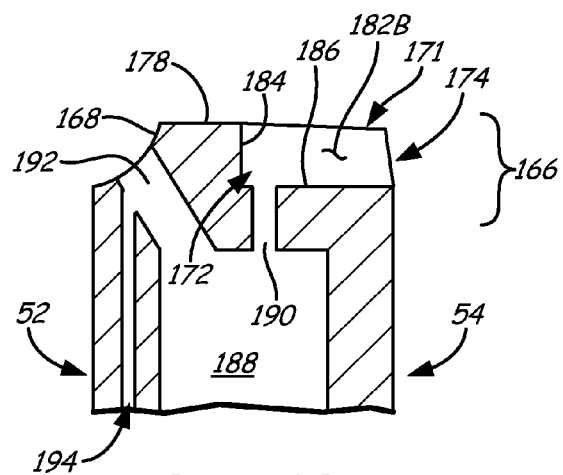
FIG. 6B is a partial cross-section of the alternative rotor blade tip wall configuration shown in FIG. 6A.

FIG. 6A shows tip wall 166, which also includes pressure sidewall 52, suction sidewall 54, airfoil leading edge 58, airfoil trailing edge 60, tip shelf 168, tip leakage control channel 170, tip leakage control vanes 171, control channel inlet 172, control channel outlets 174, tip floor 176, tip rib 178, control vane leading portions 180, control vane trailing portions 181, control channel/vane sidewalls 182A, 182B, tip rib suction side 184, control channel floor 186, channel cooling aperture 190, tip shelf cooling apertures 192, and airfoil sidewall microcircuit 194. FIG. 6B is a cross-section taken across line 6B-6B of FIG. 6A.

Tip wall 166 is a first alternative embodiment of tip wall 66 described above. Similar to FIG. 2, pressure sidewall 52 and sidewall 54 each extend spanwise from airfoil base 56 between leading edge 58 and trailing edge 60. Airfoil 50 also includes tip wall 166 extending chordwise from leading edge 58 to trailing edge 60. In this first example alternative embodiment, at least one curved tip leakage control vane 171 projects radially outward in a spanwise direction from tip wall 166. Control vanes 171 each include leading vane portion 180 and trailing portion 181 between adjacent sidewalls 182A, 182B. Control vane leading portion 180 begins proximate a junction of airfoil pressure sidewall 52 and tip wall 166. Control vane trailing portion 181 terminates proximate a junction of airfoil suction sidewall 54 and tip wall 166.

In this first alternative embodiment, rather than having channels recessed into a tip floor as shown in FIGS. 3A and 3B, vanes 171 extend radially outward from a lower tip floor 176 extending at least partway between airfoil leading edge 58 and trailing edge 60. More than one leakage control vane 171 can be distributed chordwise across at least a portion of tip floor 176. A corresponding curved tip leakage control channel 170 can be defined at least in part by adjacent ones of the plurality of tip leakage control vanes 171. As above, channel inlet 172 can be defined by adjacent control vane leading portions 180, and channel outlet 174 can be defined by adjacent control vane trailing portions 181.

Tip rib 178 can also project spanwise from at least a chordwise portion of tip wall 166. In certain embodiments, tip rib 178 can extend at least partway between airfoil leading edge 58 and airfoil trailing edge 60 along pressure side of tip wall 166, outward from tip floor 176. In certain embodiments, such as is shown in FIG. 6A, of the control vane leading portion 196 can be contiguous with tip rib suction side surface 184. Tip shelf 168 with cooling apertures 192 (in fluid communication with internal cooling cavity 188 and/or microcircuits 194) can be recessed into a pressure side surface of tip rib 178. Alternatively, the pressure side surface of tip rib 178 can be an extension of pressure sidewall 52.

Similar to the illustrations shown in FIGS. 5A and 5B, control vane 171 can have leading portion 180 forming leading interior angle $\beta_1$ relative to pressure sidewall 52, and vane trailing portion forming interior angle $\beta_2$ relative to suction sidewall 54. In certain embodiments, angle $\beta_2$ can be less than or equal to $\beta_1$, which increases the chordwise component of leakage flow to reduce vortices and enhances work recovery from the captured leakage flow as described above with respect to FIGS. 5A and 5B.

Figure 7A:
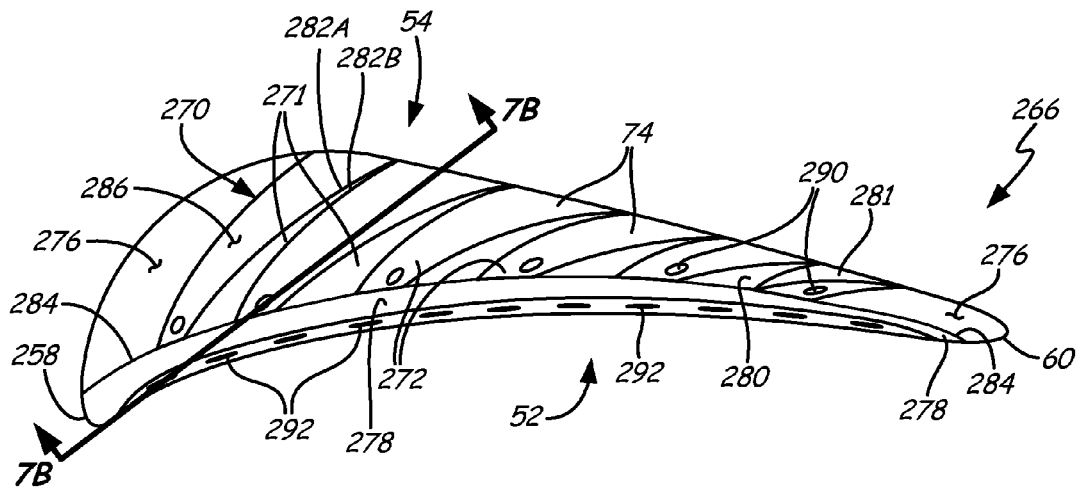
FIG. 7A is a top plan view of a second alternative tip wall configuration.

FIG. 7A shows tip wall 266, which also includes pressure sidewall 52, suction sidewall 54, airfoil leading edge 58, airfoil trailing edge 60, tip shelf 268, ramped tip leakage control channel 270, tip leakage control vanes 271, control channel inlets 272, control channel outlets 274, tip floor 276, tip rib 278, control vane leading portions 280, control vane trailing portions 281, control channel/vane sidewalls 282A, 282B, tip rib suction side 284, ramped control channel floor 286, channel cooling aperture 290, tip shelf cooling apertures 292, and airfoil sidewall microcircuit 294. FIG. 6B is a cross-section taken across line 6B-6B of FIG. 6A.

Tip wall 266 is a second alternative embodiment of tip wall 66 described above. Similar to FIG. 2, pressure sidewall 52 and sidewall 54 each extend spanwise from airfoil base 56 between leading edge 58 and trailing edge 60. Airfoil 50 also includes tip wall 266 extending chordwise from leading edge 58 to trailing edge 60. In this second example alternative embodiment, tip shelf 266 includes at least one curved and ramped tip leakage control channel 270.

In this second example alternative embodiment, leakage control channel floor 286 is ramped upward, in contrast to the substantially flat channel floor 86 shown in FIGS. 3A and 3B. Thus, control channel 270 is shallower at the suction side exit than at the pressure side inlet. As a result, leakage flow $G_L$ is provided with increased pressure and exit velocity is decreased, allowing for more uniform leakage flow entering suction gas stream $G_S$.

Figure 7B:
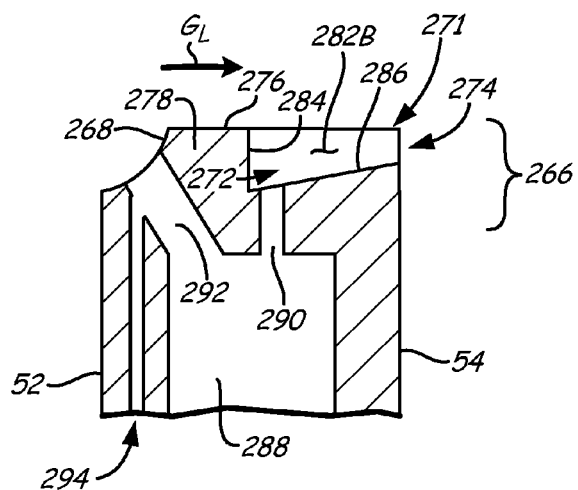
FIG. 7B is a partial cross-section of the alternative tip wall configuration shown in FIG. 7A.

Leakage flow can be further controlled by widening control channel outlets 274. As was shown in FIGS. 5A and 5B, leakage control channels have an inlet width $W_1$ that may be the same as or differ from outlet width $W_2$. In certain embodiments, including but not limited to the second alternative example embodiment of FIGS. 7A and 7B, outlet width $W_2$ is greater than inlet width $W_1$ so as to further improve uniformity of the leakage flow entering suction gas stream $G_S$. In certain of those embodiments, outlet width $W_2$ is approximately equal to the pitch $P_C$ between adjacent control channels (see FIG. 5A). In such embodiments, as outlet width $W_2$ approaches the local channel pitch $P_C$, the trailing chordwise thickness $t_2$ of adjacent leakage control vanes 271 will be less than leading control vane thickness $t_1$ and will approach zero at the junction of suction sidewall 54 and tip wall 266. These shapes also contribute to reduced flow separation and tip vortices adjacent leakage control vanes 271.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments [Add at Second Draft]

The following are non-exclusive descriptions of possible embodiments of the present invention.

A turbine airfoil comprises a suction sidewall, a pressure sidewall, a tip wall, and a tip leakage control channel. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control channel has an inlet and an outlet recessed into an outer surface of the tip wall. An inlet of the channel begins proximate a junction of the airfoil pressure sidewall and the tip wall. An outlet of the channel terminates at a recessed portion of the junction of the tip wall and the suction sidewall.

The turbine airfoil of the preceding paragraph can optionally include, additionally and/or alternatively, any one or more of the following features, configurations and/or additional components:

A turbine airfoil according to an exemplary embodiment of this disclosure, among other possible things, includes a suction sidewall, a pressure sidewall, a tip wall, and a tip leakage control channel. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control channel has an inlet and an outlet recessed into an outer surface of the tip wall. An inlet of the channel begins proximate a junction of the airfoil pressure sidewall and the tip wall. An outlet of the channel terminates at a recessed portion of the junction of the tip wall and the suction sidewall.

A further embodiment of the foregoing turbine airfoil wherein the channel inlet additionally and/or alternatively forms a channel entrance interior angle $\alpha_1$ relative to the pressure sidewall, and the channel outlet forms a channel exit interior angle $\alpha_2$ relative to the suction sidewall, angle $\alpha_2$ being less than or equal to $\alpha_1$.

A further embodiment of any of the foregoing turbine airfoils, wherein the channel entrance angle $\alpha_1$ is additionally and/or alternatively between about 80° and about 95°.

A further embodiment of any of the foregoing turbine airfoils, wherein the channel exit angle $\alpha_2$ is additionally and/or alternatively less than about 90°.

A further embodiment of any of the foregoing turbine airfoils, wherein the turbine airfoil additionally and/or alternatively comprises a plurality of tip leakage control channels distributed across at least a chordwise portion of the tip wall between the airfoil leading edge and the airfoil trailing edge.

A further embodiment of any of the foregoing turbine airfoils, wherein the turbine airfoil additionally and/or alternatively includes a corresponding tip leakage control vane integrally formed on the tip wall between adjacent ones of the plurality of tip leakage control channels.

A further embodiment of any of the foregoing turbine airfoils, wherein a second chordwise channel width $W_2$ proximate the recessed outlet is additionally and/or alternatively equal to or greater than a chordwise channel width $W_1$ proximate the inlet.

A further embodiment of any of the foregoing turbine airfoils, wherein the second chordwise channel width $W_2$ is additionally and/or alternatively approximately equal to a pitch $P_C$.

A further embodiment of any of the foregoing turbine airfoils, wherein the channel additionally and/or alternatively includes at least one cooling aperture in fluid communication with an internal cooling cavity.

A further embodiment of any of the foregoing turbine airfoils, wherein the turbine airfoil additionally and/or alternatively further comprises a tip shelf recessed into a junction of the airfoil pressure sidewall and the tip wall, the tip shelf extending along at least a chordwise portion of the junction between the airfoil leading edge and the airfoil trailing edge.

A turbine airfoil comprises a suction sidewall, a pressure sidewall, a tip wall, and a tip leakage control vane. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control vane projects radially outward in a spanwise direction from a tip floor of the tip wall. A leading portion of the tip leakage control vane begins proximate a junction of the airfoil pressure sidewall and the tip wall. A trailing portion of the tip leakage control vane terminates proximate a junction of the airfoil suction sidewall and the tip wall.

The turbine airfoil of the preceding paragraph can optionally include, additionally and/or alternatively, any one or more of the following features, configurations and/or additional components:

A turbine airfoil according to an exemplary embodiment of this disclosure, among other possible things, includes a suction sidewall, a pressure sidewall, a tip wall, and a tip leakage control vane. Each sidewall extends spanwise from an airfoil base and chordwise between a leading edge and a trailing edge. The tip wall extends chordwise from the leading edge to the trailing edge and joins respective outer spanwise ends of the suction and pressure sidewalls. The tip leakage control vane projects radially outward in a spanwise direction from a tip floor of the tip wall. A leading portion of the tip leakage control vane begins proximate a junction of the airfoil pressure sidewall and the tip wall. A trailing portion of the tip leakage control vane terminates proximate a junction of the airfoil suction sidewall and the tip wall.

A further embodiment of the foregoing turbine airfoil wherein the control vane leading portion additionally and/or alternatively forms leading interior angle $\beta_1$ relative to the pressure sidewall, and the control vane trailing portion forms trailing interior angle $\beta_2$ relative to the suction sidewall, angle $\beta_2$ being less than or equal to $\beta_1$.

A further embodiment of any of the foregoing turbine airfoils, wherein the turbine airfoil additionally and/or alternatively comprises a plurality of tip leakage control vanes distributed chordwise across at least a portion of the tip wall extending between the airfoil leading edge and the airfoil trailing edge.

A further embodiment of any of the foregoing turbine airfoils, wherein a corresponding tip leakage control channel is additionally and/or alternatively defined at least in part by adjacent ones of the plurality of tip leakage control vanes, an inlet of the channel being defined by respective leading portions of the adjacent control vanes, and an outlet of the channel being defined by respective trailing portions of the adjacent control vanes.

A further embodiment of any of the foregoing turbine airfoils, wherein the turbine airfoil additionally and/or alternatively comprises a tip rib extending chordwise from the airfoil leading edge to the airfoil trailing edge, a suction side surface of tip rib contiguous with a leading portion of the tip leakage control vane.

A further embodiment of any of the foregoing turbine airfoils, wherein the turbine airfoil additionally and/or alternatively comprises a tip shelf recessed into a junction of the airfoil pressure sidewall and the tip wall, the tip shelf extending along at least a chordwise portion of the junction between the airfoil leading edge and the airfoil trailing edge.

A further embodiment of any of the foregoing turbine airfoils, wherein additionally and/or alternatively, a trailing vane thickness $t_2$ is approximately zero.

A method for reducing airfoil tip leakage losses comprises capturing a portion of working fluid leakage flow in a leakage control channel formed into a radially outer surface of an airfoil tip wall. The captured portion of the leakage flow is redirected toward an airfoil trailing edge through a curved portion of the tip leakage control channel. The redirected portion of the leakage flow is ejected out of the tip leakage control channel into a suction side gas stream below a junction of an airfoil suction sidewall and the radially outer surface of the tip wall.

The method of the preceding paragraph can optionally include, additionally and/or alternatively, any one or more of the following steps, features, configurations and/or additional components:

A method for reducing airfoil tip leakage losses according to an exemplary embodiment of this disclosure, among other possible things, includes capturing a portion of working fluid leakage flow in a leakage control channel formed into a radially outer surface of an airfoil tip wall. The captured portion of the leakage flow is redirected toward an airfoil trailing edge through a curved portion of the tip leakage control channel. The redirected portion of the leakage flow is ejected out of the tip leakage control channel into a suction side gas stream below a junction of an airfoil suction sidewall and the radially outer surface of the tip wall.

A further embodiment the foregoing method, wherein the capturing, redirecting, and ejecting steps are performed using a plurality of tip leakage control channels formed chordwise across the radially outer surface of the tip wall.

A further embodiment of any of the foregoing methods, wherein the method additionally and/or alternatively comprises directing the captured working fluid tangentially against a tip leakage control vane to recover work from the captured working fluid.

A further embodiment of any of the foregoing methods, wherein outwardly facing sidewalls of the tip leakage control vane are additionally and/or alternatively defined by inwardly facing sidewalls of chordwise adjacent ones of the plurality of tip leakage control channels.

A further embodiment of any of the foregoing methods, wherein additionally and/or alternatively, an inlet portion of the tip leakage control channel is substantially perpendicular to, and offset widthwise from, a junction of the tip wall and an airfoil pressure sidewall.

A further embodiment of any of the foregoing methods wherein the method additionally and/or alternatively comprises prior to the capturing step, impeding working fluid leakage flow over the airfoil tip wall.

A further embodiment of any of the foregoing methods, wherein the impeding step is additionally and/or alternatively performed by directing a coolant flow outward through a plurality of cooling apertures in a tip shelf disposed along at least a chordwise portion of a junction of the tip wall and the airfoil pressure sidewall.

A further embodiment of any of the foregoing methods, wherein the redirecting step additionally and/or alternatively increases a tangential momentum component of the captured leakage flow prior to the ejecting step to reduce the size and strength of one or more tip leakage vortices in the suction side gas stream.

The invention claimed is:

1. A turbine airfoil comprising:
a suction sidewall and a pressure sidewall, each sidewall extending spanwise from an airfoil base and extending chordwise between a leading edge and a trailing edge;
a tip wall extending chordwise from the leading edge to the trailing edge and joining respective outer spanwise ends of the suction and pressure sidewalls; and
a plurality of tip leakage control channels distributed across at least a chordwise portion of the tip wall between the airfoil leading edge and the airfoil trailing edge, each channel recessed into an outer surface of the tip wall, an inlet of each channel beginning proximate a junction of the airfoil pressure sidewall and the tip wall, an outlet of each channel terminating at a recessed portion of a junction of the tip wall and the suction sidewall, and a portion of each channel curved toward the trailing edge from the inlet to the outlet.

2. The airfoil of claim 1, wherein each channel inlet forms a channel entrance interior angle $\alpha_1$ relative to a downstream side of the pressure sidewall, and each channel outlet forms a channel exit interior angle $\alpha_2$ relative to a downstream side of the suction sidewall, angle $\alpha_2$ being less than or equal to $\alpha_1$.

3. The airfoil of claim 2, wherein the channel entrance angle $\alpha_1$ is between 80° and 95°.

4. The airfoil of claim 3, wherein the channel exit angle $\alpha_2$ is less than 90°.

5. The airfoil of claim 1, wherein a corresponding plurality of tip leakage control vanes are integrally formed on the tip wall between adjacent ones of the plurality of tip leakage control channels, each vane curved toward the trailing edge from a vane leading portion to a vane trailing portion.

6. The airfoil of claim 5, further comprising a tip rib formed along a pressure side of the tip wall from the airfoil leading edge to the airfoil trailing edge;
wherein at least one of the plurality of curved tip leakage control vanes is contiguous with a suction side of the tip rib and at least one tip leakage control vane has its respective inlet on a suction side of the tip rib.

7. The airfoil of claim 6, further comprising a tip shelf recessed into a pressure side of the tip rib at a junction of the airfoil pressure sidewall and the tip wall, the tip shelf extending along at least a chordwise portion of the junction between the airfoil leading edge and the airfoil trailing edge.

8. The airfoil of claim 1, wherein a second chordwise channel width $W_2$ proximate the recessed outlet is equal to or greater than a chordwise channel width $W_1$ proximate the inlet.

9. The airfoil of claim 8, wherein the second chordwise channel width $W_2$ is equal to a pitch $P_C$.

10. The airfoil of claim 1, wherein at least one of the plurality of channels includes at least one cooling aperture in fluid communication with an internal cooling cavity.

11. A turbine airfoil comprising:
a suction sidewall and a pressure sidewall, each sidewall extending spanwise from an airfoil base and extending chordwise between a leading edge and a trailing edge;
a tip wall having a tip floor extending chordwise from the leading edge to the trailing edge and joining respective outer spanwise ends of the suction and pressure sidewalls; and
a plurality of tip leakage control vanes distributed chordwise across at least a portion of the tip floor extending between the airfoil leading edge and the airfoil trailing edge, each tip leakage control vane projecting radially outward in a spanwise direction from the tip floor, a leading portion of each tip leakage control vane beginning proximate a junction of the airfoil pressure sidewall and the tip wall, a trailing portion of each tip leakage control vane terminating proximate a junction of the airfoil suction sidewall and the tip wall, and a portion curved toward the airfoil trailing edge between the leading portion and the trailing portion.

12. The airfoil of claim 11, wherein each control vane leading portion forms leading interior angle $\beta_1$ relative to a downstream side of the pressure sidewall, and each control vane trailing portion forms trailing interior angle $\beta_2$ relative to a downstream side of the suction sidewall, angle $\beta_2$ being less than or equal to $\beta_1$.

13. The airfoil of claim 11, wherein a corresponding plurality of curved tip leakage control channels are defined at least in part by adjacent ones of the plurality of tip leakage control vanes, an inlet of each channel being defined by respective leading portions of the adjacent control vanes, and an outlet of each channel being defined by respective trailing portions of the adjacent control vanes.

14. The airfoil of claim 11, further comprising a tip rib extending chordwise from the airfoil leading edge to the airfoil trailing edge, a suction side surface of tip rib contiguous with a leading portion of at least one of the plurality of tip leakage control vanes.

15. The airfoil of claim 14, further comprising a tip shelf recessed into a pressure side of the tip rib at a junction of the airfoil pressure sidewall and the tip wall, the tip shelf extending along at least a chordwise portion of a junction between the airfoil leading edge and the airfoil trailing edge.

16. The airfoil of claim 11, wherein a trailing vane thickness $t_2$ of at least one of the plurality of tip leakage control vanes is zero along the junction of the suction sidewall and the tip wall.

17. A method for reducing airfoil tip leakage losses, the method comprising:
   capturing a plurality of portions of working fluid leakage flow passing over a junction of an airfoil tip and a pressure sidewall in a leakage control channel formed into a radially outer surface of an airfoil tip wall;
   redirecting each captured portion of the leakage flow downstream toward an airfoil trailing edge through a curved portion of each tip leakage control channel; and
   ejecting the redirected portion of the leakage flow out of each tip leakage control channel into a suction side gas stream below a junction of the airfoil suction sidewall and the radially outer surface of the tip wall;
   wherein the curved portion of each channel is curved downstream toward a trailing edge of the airfoil from a channel inlet proximate a pressure sidewall to a channel outlet at a suction sidewall.

18. The method of claim 17, further comprising directing at least one of the plurality of portions of the captured working fluid tangentially against at least one tip leakage control vane to recover work from the captured working fluid.

19. The method of claim 18, wherein outwardly facing sidewalls of the tip leakage control vane are defined by inwardly facing sidewalls of chordwise adjacent ones of the plurality of tip leakage control channels.

20. The method of claim 17, wherein an inlet portion of the at least one tip leakage control channel is substantially perpendicular to, and offset widthwise from, a junction of the tip wall and an airfoil pressure sidewall.

21. The method of claim 17, further comprising prior to the capturing step, impeding working fluid leakage flow over the airfoil tip wall.

22. The method of claim 21, wherein the impeding step is performed by directing a coolant flow outward through a plurality of cooling apertures in a tip shelf disposed along at least a chordwise portion of a junction of the tip wall and the airfoil pressure sidewall.

23. The method of claim 17, wherein the redirecting step increases a downstream tangential momentum component of the captured leakage flow prior to the ejecting step to reduce a size and strength of one or more tip leakage vortices in the suction side gas stream.

\* \* \* \* \*